May 28, 1963  T. W. SMOOT ETAL  3,091,014
CRADLE
Filed May 7, 1962
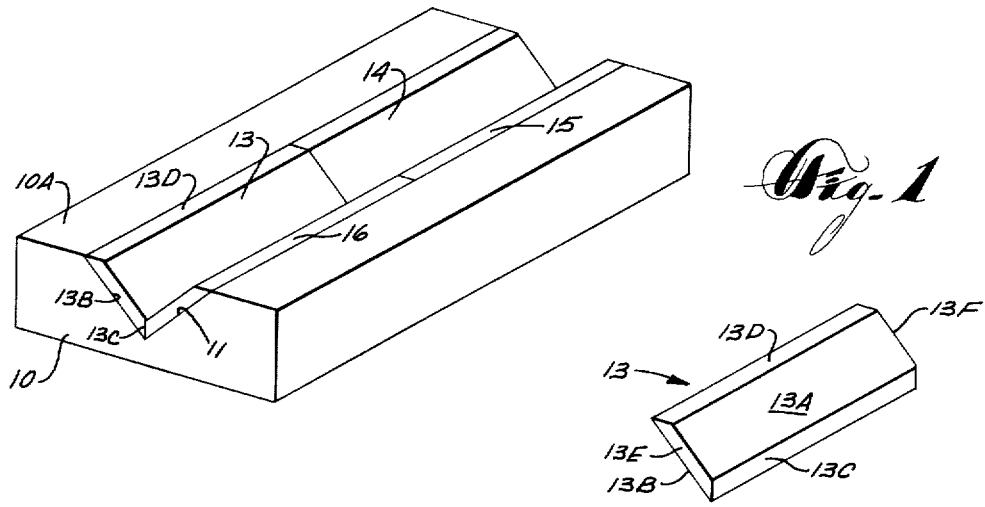
Fig. 1
Fig. 2
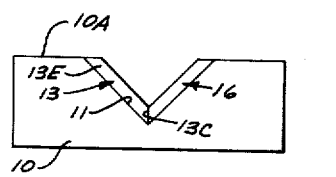
Fig. 3
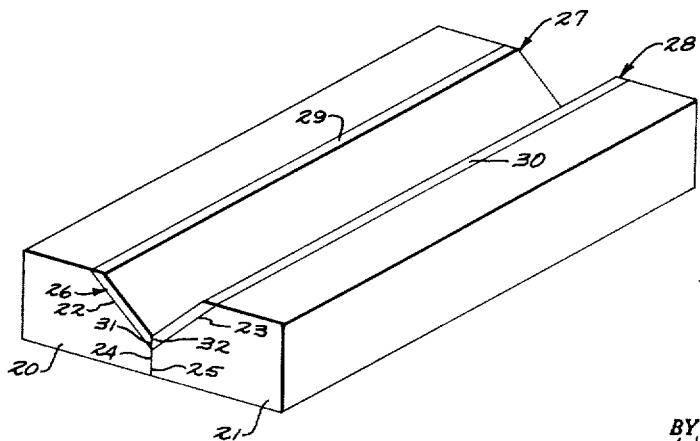
Fig. 4
INVENTORS
THOMAS W. SMOOT
DONALD F. STOCK
BY
ATTORNEY

United States Patent Office 3,091,014
Patented May 28, 1963

3,091,014
CRADLE
Thomas W. Smoot, Bethel Park, and Donald F. Stock, Pittsburgh, Pa., assignors to Harbison-Walker Refractories Company, Pittsburgh, Pa., a corporation of Pennsylvania
Filed May 7, 1962, Ser. No. 192,760
8 Claims. (Cl. 25—153)

This invention relates to refractory cradles or setters and more particularly to composite refractory cradles or setters. The terms "cradle" and "setter" are used interchangeably to designate certain refractory shapes upon which unfired ceramic ware is placed for firing. Such shapes should not distort or warp when subjected to wide temperature variations. This characteristic is particularly important when used to support certain ceramic ware which must not, itself, become bent or warped on firing. For example, certain straight tubular pieces of ceramic laboratory ware, round bottomed refractory crucibles and other refractory shapes, must maintain certain physical tolerances on firing.

Further, the setters should be chemically stable or inert relative to the ceramic material of the unfired ware they are to support. This latter requirement, together with the ability to withstand wide temperature variations, can be satisfied with certain refractory materials but is becoming increasingly difficult to satisfy economically, as contemporary industry is requiring fired refractory shapes of such exotic refractory materials as beryllia, stabilized zirconia, etc., which are fired to temperatures upwards of 3300° F.

Accordingly, it is an object of this invention to provide improved refractory cradles or setters. It is another object of this invention to provide improved composite refractory cradles or setters, which do not distort when subected to wide temperature variations, and which are inert to most metal oxides. And it is still another object of this invention to provide a relatively economical and easily manufactured, composite refractory cradle, which includes the provision for parts substitution thereby increasing the useful life of the cradles.

Briefly, according to one embodiment of this invention, a composite setter construction is provided. The construction includes a base block and a set of substantially identical firing blocks. The firing blocks and the base block are arranged for loose assembly to form the composite setter construction. The firing blocks are fabricated of high purity refractory material exhibiting a stable, relatively inert, crystalline structure over wide temperature variations, and the base block is fabricated of a material selected from that group comprised of high purity refractory oxides, which are compatible with the firing block material at high temperatures.

In a preferred embodiment, the firing blocks are fabricated of metal oxide stabilized high purity zirconia of 99+% purity. The base block is fabricated of 97+% purity periclase.

A better understanding, other features and further objects and advantages of composite setter construction, according to the concepts of this invention, will become obvious to those skilled in the ceramic and refractory arts by a study of the following detailed description with reference to the drawings. In these drawings:

FIG. 1 is a perspective view of a composite setter construction according to the concepts of this invention.

FIG. 2 is a side elevation of an alternative setter construction according to this invention.

FIG. 3 is a perspective view of one of the firing blocks of the setter constructions of FIGS. 1 and 2; and FIG. 4 is a perspective view of still another alternative composite setter construction according to the concepts of this invention.

Before describing the drawings in detail, it is to be understood they are but exemplary of possible constructions within the concepts of the invention, and that the true measure of the spirit and scope of the invention is to be as defined in the hereafter set forth claims.

In a preferred embodiment of this invention the firing blocks, which are to actually contact and hold an unfired refractory object during its firing, are fabricated of high purity stabilized zirconia. To more clearly understand the invention, it is thought a brief description of the character of zirconia and stabilized zirconia, and their physical characteristics, will be useful.

Zirconia has the chemical formula $ZrO_2$. It can exist, under certain conditions, in three different crystalline forms; namely, the monoclinic, the tetragonal and the cubic. The monoclinic form usually exists between 0 and 1000° C., the tetragonal between 1000° C. and about 1900° C., and the cubic form exists from about 1900° C. to melting at about 2700° C. In a pure system, these crystal phase transformations are reversible, but such phase changes are always accompanied by an appreciable and undesirable variation in density. Hence, although the cubic phase is the most desirable for refractory purposes, it is distressingly unstable when pure. Therefore, zirconia, upon heating and cooling under normal refractory practices, does not exhibit reversible thermal expansion, but rather, its tendency to at least partially change its crystalline makeup during each heating and cooling cycle, eventually causes almost complete destruction of refractory shapes fabricated thereof. Therefore, to use the otherwise desirable refractory oxide which zirconia is, workers in the art have produced what is termed "stabilized zirconia."

Stabilized zirconia is zirconia substantially entirely exhibiting a cubic crystallite structure the individual crystals of which are "propped," as it were, to prevent their disintegration at lower temperatures. For example, calcium oxide is conventionally used to produce a stabilized zirconia refractory material. In practice, stabilization is brought about in one method by mixing from 3 to 6%, by weight, of 99+% calcium oxide with 97 to 94% zirconia. All of the calcium oxide and zirconia is very finely divided i.e., 100%—325 mesh. The mixture is heated to about 2900° F. and held for a period of time sufficient to induce complete stabilization of the zirconia crystals. The product which results is assigned the formula $(Ca \cdot Zr)O_2$. Material selected to stabilize zirconia must have an ionic radius substantially the same as the ionic radius of the zirconium ion. The zirconium ion, in cubic configuration, has an ionic radii of about .87 angstroms. $Ca^{++}$ ions exhibit an average ionic radius of about 1.06 angstroms. Other materials having an ion radius within about +20% of the .87 angstrom radius of the zirconia are also usable. For example, $Mg^{++}$, having an ion radius of about 0.78 angstrom, is a good stabilizer. $Y^{+++}$, which has an ionic radius of about 1.06 angstroms, is also usable. In stabilizing zirconia, ions which make up the material used for stabilization appear to enter the cubic structure of zirconia replacing in part zirconium ions in the cubic form. The minor differences in ionic radii involved in these substitutions apparently prevent the phase changes which take place in the pure state, thereby stabilizing the structure in the cubic phase. The thus "stabilized" zirconia crystals exhibit remarkably uniform reversible thermal expansion.

Such stabilized zirconia is remarkably inert to various of the exotic refractory oxides discussed above, and is a very desirable material for fabricating various items of kiln furniture. However, the expense of the stabilized zirconia has severely delimited its commercial feasibility.

We have discovered, however, that by use of a back-up or base material having certain critical physical and chemical characteristics, and providing a relatively thin stabilized zirconia lining or ware support surface for the base material, in a particular manner of composite construction, that relatively inexpensive refractory kiln furniture can be provided which, over wide temperature ranges, exhibits all of the desirable attributes of kiln furniture made entirely from stabilized zirconia.

Referring now to the drawings, in one embodiment, a solid block 10 of 97+% purity periclase is provided. A V-shaped slot 11 is formed the longitudinal extent of the block 10. A set of substantially identical firing blocks 13, 14, 15 and 16 are loosely fitted in the slot 11. The firing blocks are loosely fitted to allow for the difference in thermal expansion between themselves and the base block. Each of the firing blocks is carefully machined to provide substantially planar faces, such as faces 13A and 13B of block 13 as shown in FIG. 3. The lower transverse edge 13C of block 13 is sloped. The slope of surface 13C is such as to be compatible with the complimentary sloped edge of an opposed firing block—such as firing block 16 in FIG. 1, so that together their respective outer faces—such as face 13B of block 13, lie contiguous with an adjacent wall defining notch 11. The upper transverse edge 13D is preferably machined to provide a slope such that, upon assembling in the notch 11 of the base block 10 with the other identical blocks such as block 16, the transverse edge 13D will lie in substantially the same plane as the upper surface 10A of the base block. The opposite ends of all the firing blocks, such as 13E and 13F of the block 13, are parallel to each other and perpendicular to their opposed smooth faces— such as faces 13A and 13B of the firing block 13. Thus, upon assembling, the adjacent ends of the plurality of firing blocks may be positioned in face-to-face contiguous contact.

As another alternative embodiment, two substantially identical periclase base blocks 20 and 21 are provided. Each of the blocks 20 and 21 has one of its transverse edges biassed as at 22 and 23; such that, upon contiguous abutment of their respective sides 24 and 25, a V-shaped notch 26 is formed. Two substantially identical stabilized zirconia firing blocks 27 and 28 are provided which have their respective longitudinal edges 29 and 30, and 31 and 32 so sloped as to form a lining for the notch 26.

The firing blocks, as noted above, are carefully machined to within carefully controlled dimensional tolerances, so as to substantially precisely form a contiguous lining for such as a notch-like depression formed in the base block. Also, it is preferable that the firing blocks be substantially identical so as to provide for economical parts substitution.

The material of which the base block is fabricated must be selected from that group consisting of refractory metal oxide materials, which are compatible over a wide temperature range with the materials comprising the firing blocks. With stabilized zirconia firing blocks, the choice of high purity periclase for the base block is especially preferable because periclase and stabilized zirconia are chemically compatible and relatively inert over a wide range of temperatures, and appear to have the added advantage that materials such as periclase help to maintain the stabilized state of the zirconia, since the magnesium ion (of the periclase) is within the preferred about +20% of the ionic radius of the zirconium ion. As noted above, the material selected for fabrication of the base blocks may be such as high purity periclase. However, it is necessary that any selected material be substantially free of iron oxides and silica, in order to prevent interface reaction between the stabilized zirconia lining and the base blocks.

It should be understood that other than the generally prismoidal configurations shown in the drawings may be provided within the teachings of this invention—such as a generally hemispherical depression in a selected base block and a plurality of substantially identical half or quarter hemispherical shaped stabilized zirconia inserts. However, in any instance, the plurality of elements, which together cooperate to provide a lining for the base block should be machined to within carefully controlled dimensional tolerances so as to provide a contiguous lining for the base block.

Having thus described the invention in detail and with sufficient particularity as to enable those skilled in the art to practice it, what is desired to have protected by Letters Patent, is set forth in the following claims:

We claim:
1. A composite setter construction comprising base means, support means substantially contiguously covering a portion of said base means, the support means being fabricated of high purity stabilized zirconia, and said base means fabricated of material selected from that group consisting essentially of high purity refractory oxide material capable of stabilizing cubic zirconia crystals.

2. A composite setter construction comprising base means, support means substantially contiguously covering a portion of said base means, the support means being fabricated of high purity stabilized zirconia, and said base means fabricated of a metal oxide the ionic radii of the metal ions of which is within substantially about +20% of the ionic radius of the zirconium ions.

3. The setter construction of claim 2, in which the base means is fabricated of 97+% purity periclase.

4. The setter construction of claim 2, in which the depression is a longitudinal V-shaped groove.

5. The setter construction of claim 4, in which the support means consists of a plurality of substantially identical units.

6. The setter construction of claim 4, in which the base means is a plurality of refractory shapes which together cooperate to form said depression.

7. The setter construction of claim 4, in which the support means is comprised of four identical prismoidally shaped units.

8. A composite setter construction comprised of a 97+% purity periclase base block, a longitudinal V-shaped notch formed across one surface of the base block, a plurality of substantially identical 98+% purity stabilized zirconia firing blocks, said firing blocks so constructed and arranged as to contiguously lie against the walls defining said V-shaped notch and provide a lining therefore.

References Cited in the file of this patent

UNITED STATES PATENTS

| 1,186,491 | Moorcraft | June 6, 1916 |
| 2,867,888 | Schaefer et al. | Jan. 13, 1959 |
| 3,026,595 | Luchowici | Mar. 27, 1962 |

FOREIGN PATENTS

| 197,889 | Great Britain | May 24, 1923 |

UNITED STATES PATENT OFFICE
CERTIFICATE OF CORRECTION

May 28, 1963

Patent No. 3,091,014

Thomas W. Smoot et al.

It is hereby certified that error appears in the above numbered patent requiring correction and that the said Letters Patent should read as corrected below.

Column 2, line 56, column 3, line 67, and column 4, line 37, for "+20%", each occurrence, read -- ±20% --; column 2, line 58, for "ion" read -- ionic --.

Signed and sealed this 3rd day of December 1963.

(SEAL)
Attest:

ERNEST W. SWIDER

Attesting Officer

EDWIN L. REYNOLDS

Acting Commissioner of Patents